(12) United States Patent
Niu et al.

(10) Patent No.: US 11,002,554 B2
(45) Date of Patent: May 11, 2021

(54) NAVIGATION SYSTEM WITH CUSTOMIZATION MECHANISM AND METHOD OF OPERATION THEREOF

(71) Applicant: Telenav, Inc., Sunnyvale, CA (US)

(72) Inventors: Xiaochuan Niu, Cupertino, CA (US); Gregory Stewart Aist, San Mateo, CA (US); Rajeev Agarwal, Fremont, CA (US)

(73) Assignee: Telenav, Inc., Santa Clara, CA (US)

( * ) Notice: Subject to any disclaimer, the term of this patent is extended or adjusted under 35 U.S.C. 154(b) by 103 days.

(21) Appl. No.: 14/038,122

(22) Filed: Sep. 26, 2013

(65) Prior Publication Data

US 2015/0088407 A1 Mar. 26, 2015

(51) Int. Cl.
*G01C 21/34* (2006.01)

(52) U.S. Cl.
CPC ..... *G01C 21/3415* (2013.01); *G01C 21/3446* (2013.01); *G01C 21/3484* (2013.01)

(58) Field of Classification Search
CPC .................................................... G01C 21/343
See application file for complete search history.

(56) References Cited

U.S. PATENT DOCUMENTS

| 7,050,905 | B2* | 5/2006 | Nemeth ........................ 701/467 |
| 7,801,675 | B2* | 9/2010 | Currie et al. ................. 701/418 |
| 7,894,984 | B2* | 2/2011 | Rasmussen et al. .......... 701/452 |
| 8,201,140 | B2 | 6/2012 | Raghavan et al. |
| 2005/0209773 | A1* | 9/2005 | Hara ............................. 701/201 |
| 2006/0195324 | A1* | 8/2006 | Birk ........................ G10L 15/28 704/275 |
| 2009/0164115 | A1* | 6/2009 | Kosakowski ...... G01C 21/3641 701/533 |
| 2009/0228207 | A1* | 9/2009 | Sasano ......................... 701/210 |
| 2012/0223845 | A1* | 9/2012 | Schumann ............. B60K 35/00 340/995.19 |
| 2015/0032424 | A1* | 1/2015 | Gupta ............... G01C 21/3641 703/2 |

* cited by examiner

*Primary Examiner* — Christian Chace
*Assistant Examiner* — Jordan S Fei
(74) *Attorney, Agent, or Firm* — Perspectives Law Group, Corp.

(57) ABSTRACT

A method of operation of a navigation system includes: determining a start guidance area excluding a current location; determining an end guidance area excluding a destination; and generating a navigation guidance with a control unit for traversing from the start guidance area to the end guidance area to reach the destination.

20 Claims, 6 Drawing Sheets

NAVIGATION SYSTEM WITH CUSTOMIZATION MECHANISM AND METHOD OF OPERATION THEREOF

TECHNICAL FIELD

The present invention relates generally to a navigation system, and more particularly to a system with customization mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without customization mechanism has become a paramount concern for the consumer. The inability decreases the benefit of using the tool.

Thus, a need still remains for a navigation system with customization mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a start guidance area excluding a current location; determining an end guidance area excluding a destination; and generating a navigation guidance with a control unit for traversing from the start guidance area to the end guidance area to reach the destination.

The present invention provides a navigation system, including: a start module for determining a start guidance area excluding a current location; an end module, coupled to the start module, for determining an end guidance area excluding a destination; and a guidance generator module, coupled to the end module, for generating a navigation guidance with a control unit for traversing from the start guidance area to the end guidance area to reach the destination.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
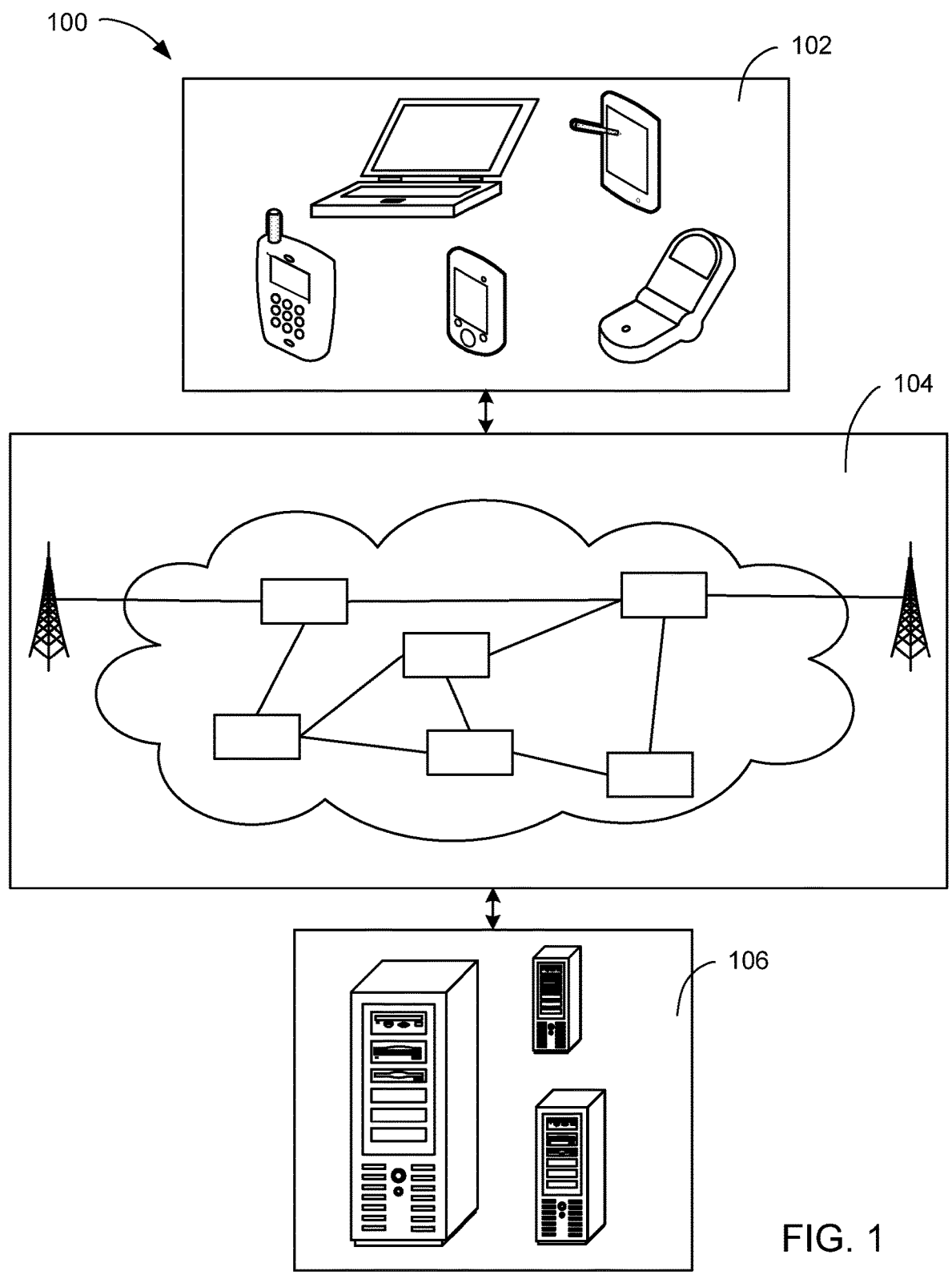
FIG. 1 is a navigation system with customization mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software.

Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with customization mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
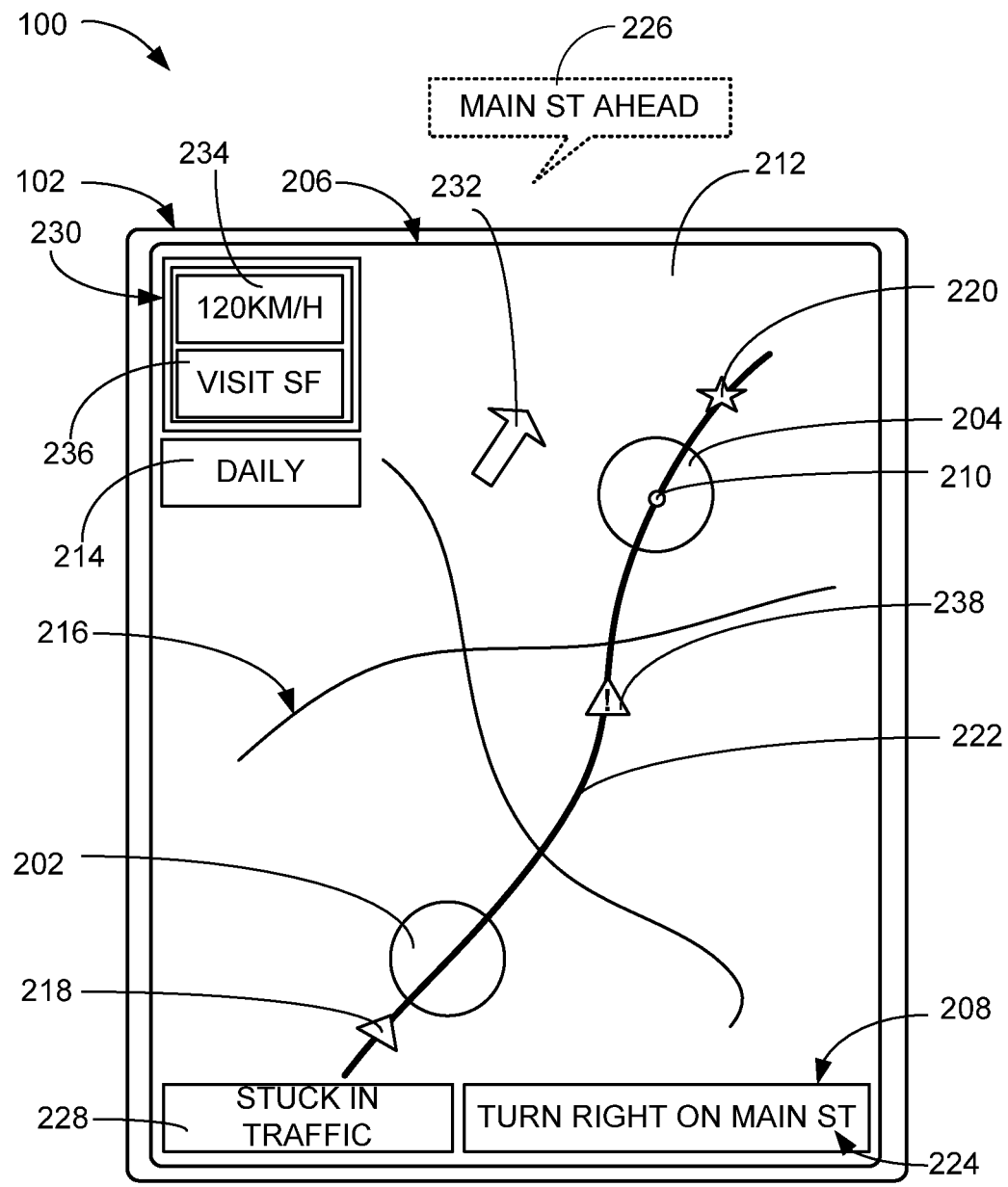
FIG. 2 is an example of a start guidance area and an end guidance area displayed on a display interface of the first device.

Referring now to FIG. 2, therein is shown an example of a start guidance area 202 and an end guidance area 204 displayed on a display interface 206 of the first device 102. For clarity and brevity, the discussion of the embodiment of the present invention will focus on the first device 102 delivering the result generated by the navigation system 100. However, the second device 106 of FIG. 1 and the first device 102 can be discussed interchangeably.

The start guidance area 202 is defined as an area or a location for initiating a navigation guidance 208. For example, the start guidance area 202 can include a geographic location 210, a geographic region 212, a travel segment 216, or a combination thereof for initiating the navigation guidance 208. The end guidance area 204 is defined as an area or a location for stopping the navigation guidance 208. For example, the end guidance area 204 can include the geographic location 210, the geographic region 212, the travel segment 216, or a combination thereof for stopping the navigation guidance 208. For further example, the start guidance area 202 can include or exclude a current location 218 of the user of the navigation system 100, a destination 220 at the end of a travel route 222, or a combination thereof. For another example, the end guidance area 204 can include or exclude the current location 218, the destination 220, or a combination thereof.

The geographic location 210 is defined as a physical location within the geographic region 212. For example, the geographic location 210 can include or exclude the current location 218, the destination 220, or a combination thereof. The current location 218 is defined as a physical location of the first device 102. The geographic region 212 is defined as a physical area surrounding the first device 102. For example, the geographic region 212 can represent the boundary established by a neighborhood, a city, a county, a state, a nation, or a combination thereof. The destination 220 can represent an end point for traveling the travel route 222.

The travel route 222 is defined as a path generated by the navigation system 100 for traveling from one physical location to another. For example, the travel route 222 can represent a path from the current location 218 to the destination 220. For another example, the travel route 222 can represent a path from the start guidance area 202 to the end guidance area 204.

The travel segment 216 is defined as a portion of a path. For example, the travel segment 216 can be represented by a variety of a route type 224. The route type 224 can include a local road, an arterial road, an expressway, a freeway, or a combination thereof. For example, the travel segment 216 can be included in the travel route 222 between the start guidance area 202 and the end guidance area 204. For another example, the travel segment 216 can be excluded from the travel route 222.

The navigation guidance 208 is defined as information provided by the navigation system 100 to aid the travel. For example, the navigation guidance 208 can include the travel route 222, a voice guidance 226, or a combination thereof. The voice guidance 226 can represent an audio information provided by the navigation system 100 to aid the travel.

A travel history 214 is defined as a record of a travel. For example, the travel history 214 can disclose the frequency of travel by the user of the navigation system 100 for the geographic location 210, the geographic region 212, the travel segment 216, or a combination thereof.

A travel context 228 is defined as a set of facts or circumstances that surround the first device 102. For example, the travel context 228 can include a route condition 230. The route condition 230 can include the current location 218, the destination 220, the travel route 222, or a combination thereof.

The route condition 230 can include a travel direction 232, a travel speed 234, a travel theme 236, a traffic condition 238, or a combination thereof. The travel direction 232 is defined as cardinal points headed towards by the first device 102. For example, the cardinal points can include north, east, south, and west. For further example, the cardinal points can include intermediate directions, such as northeast, southeast, southwest, and northwest. The travel speed 234 is defined as a magnitude of velocity of the first device 102 traveling. The travel theme 236 is defined as the purpose of the travel. For example, the travel theme 236 can represent traveling to San Francisco, Calif. (CA) for dinner or traveling to Yosemite National Park for camping. The travel context 228 can include a traffic condition 238, which is defined as state of traffic. For example, the traffic condition 238 can represent a traffic jam.

Figure 3:
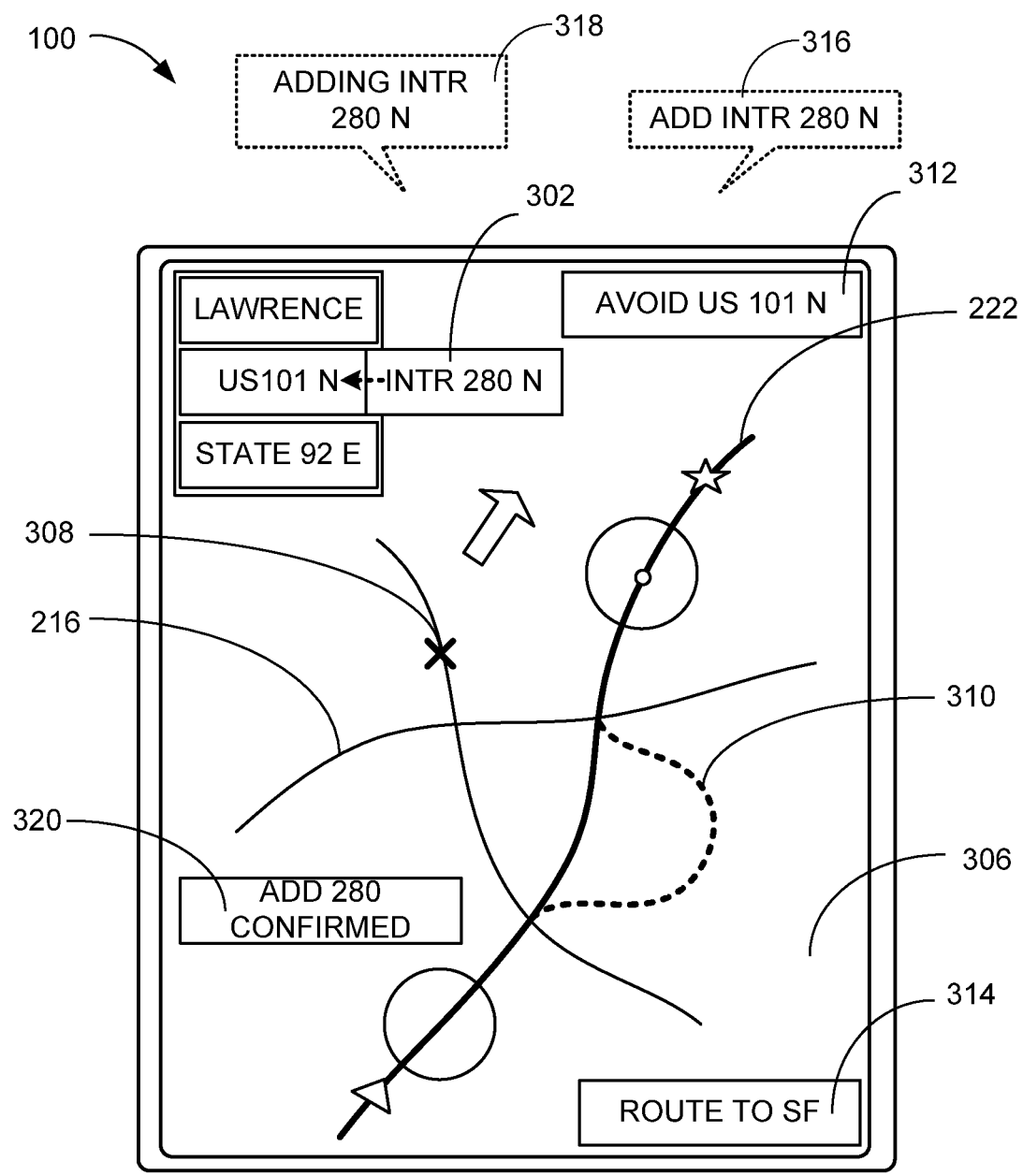
FIG. 3 is an example of a replaceable choice for the travel segment included in the travel route.

Referring now to FIG. 3, therein is shown an example of a replaceable choice 302 for the travel segment 216 included in the travel route 222. The replaceable choice 302 is defined as a candidate instance of the travel segment 216 for replacing an instance of the travel segment 216 currently included in the travel route 222. For example, the navigation system 100 can replace the travel segment 216 representing United States (US) Highway 101 with the replaceable choice 302 representing the travel segment 216, such as Interstate Highway 280. The navigation system 100 can determine the replaceable choice 302 by considering whether the travel segment 216 excluded from the travel route 222 that is within a visible area 306. The visible area 306 can represent the geographic region 212 of FIG. 2 visible on the display interface 206 of FIG. 2.

A social indicator 308 is defined as a predilection disclosed on a social networking site. For example, the social indicator 308 can represent a "like" or "dislike" about particular content. More specifically, the user of the navigation system 100 can disclose his or her favorite path for the travel segment 216 on the social networking site with the social indicator 308.

A user specified route 310 is defined as a path preselected for traveling. For example, the user of the navigation system 100 can set the user specified route 310 for reaching the destination 220 of FIG. 2. The navigation system 100 can include the user specified route 310 as part of the travel route 222. More specifically, the navigation system 100 can replace the travel segment 216 of the travel route 222 with the travel segment 216 of the user specified route 310 or the entirety of the user specified route 310.

A modification option 312 is defined update choice to replace the travel segment 216 included in the travel route 222. For example, the modification option 312 can include add or replace to include additional instance of the travel segment 216 to the travel route 222. For a different example, the modification option 312 can include remove to exclude the travel segment 216 already included in the travel route 222 or avoid particular instance of the travel segment 216 to be included in the travel route 222.

A user entry 314 is defined as an input to the navigation system 100. For example, the user of the navigation system 100 can make the user entry 314 to command the navigation system 100 to generate the travel route 222. The user entry 314 can include a voice entry 316, which is defined as an oral command to the navigation system 100.

An entry response 318 is defined as notification presented by the navigation system 100 in response to the user entry 314. For example, the entry response 318 can represent a confirmation that a request made through the user entry 314 can be met by the navigation system 100. For another example, the entry response 318 can represent a rejection by the navigation system 100 that the request made through the user entry 314 cannot be made by the navigation system 100.

An entry confirmation 320 is defined as result to indicate the availability of the replaceable choice 302. If the replaceable choice 302 is available, the entry confirmation 320 can represent "proceed" to continue with the update of the navigation guidance 208 of FIG. 2 by the navigation system 100. In contrast, if the replaceable choice 302 is unavailable, the entry confirmation 320 can represent "do not proceed" to prevent the update of the navigation guidance 208 by the navigation system 100.

Figure 4:
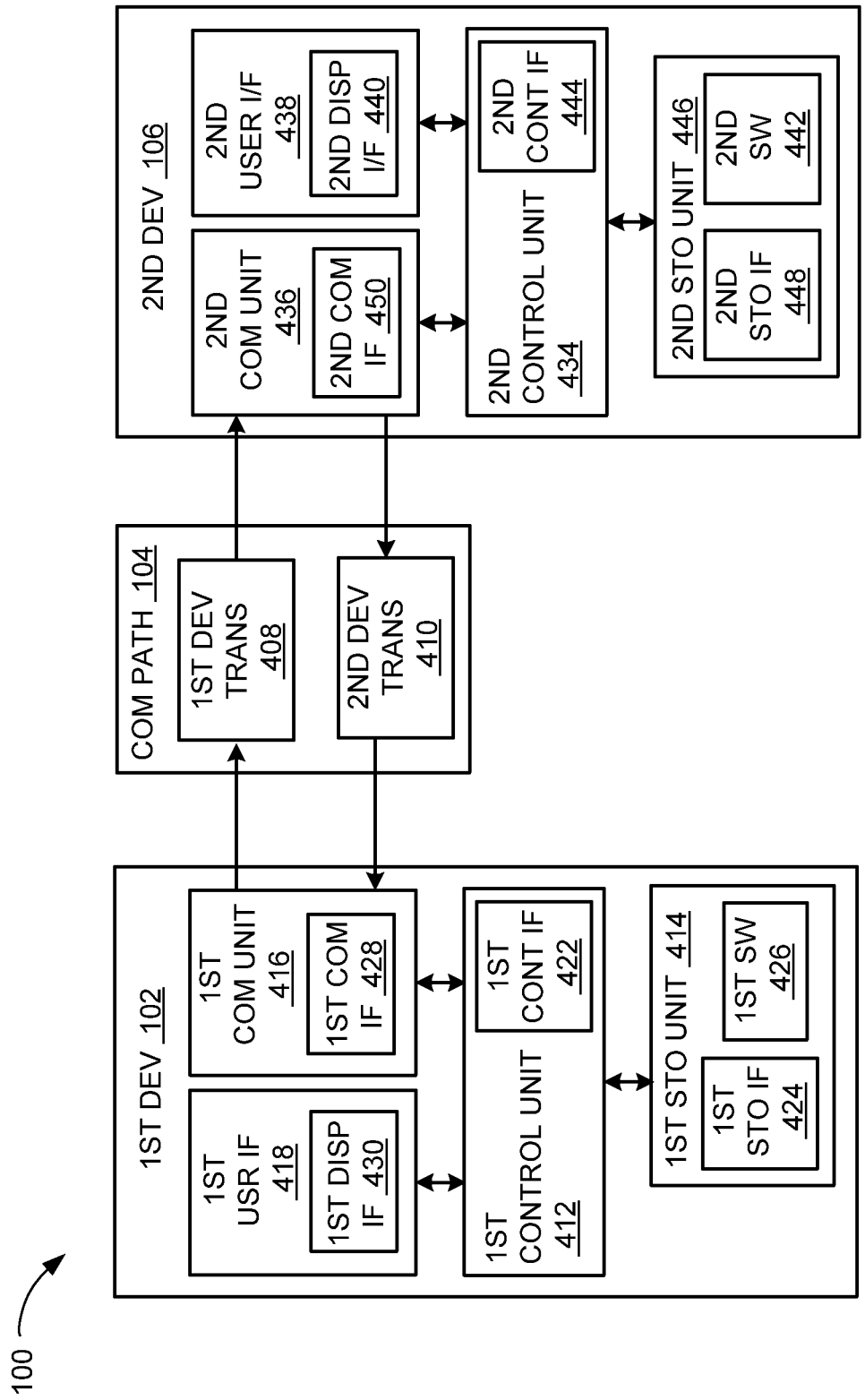
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
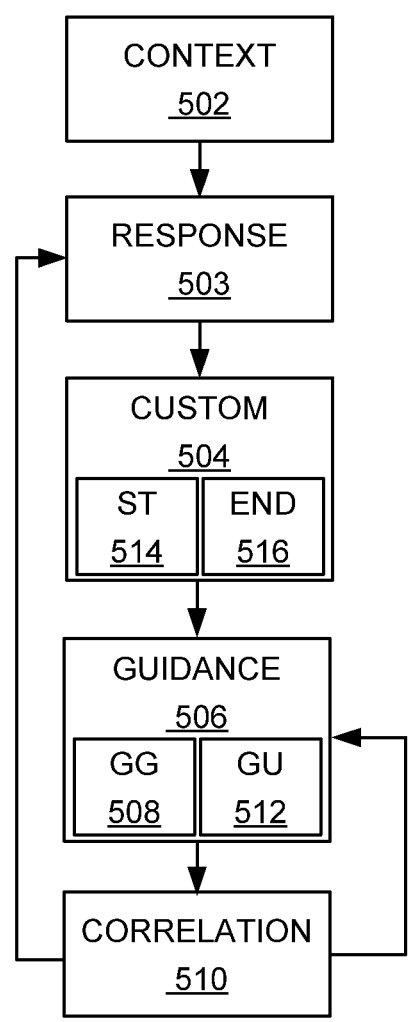
FIG. 5 is a control flow of the navigation system.

Referring now to FIG. 5, therein is shown a control flow of the navigation system 100. The navigation system 100 can include a context module 502. The context module 502 determines the travel context 228 of FIG. 2. For example, the context module 502 can determine the travel context 228 based on the route condition 230 of FIG. 2.

The context module 502 can determine the travel context 228 in a number of ways. For example, the route condition 230 can include the current location 218 of FIG. 2, the destination 220 of FIG. 2, the travel direction 232 of FIG. 2, the travel speed 234 of FIG. 2, the travel theme 236 of FIG. 2, or a combination thereof. For a specific example, the context module 502 can determine the travel context 228 based on the current location 218, the destination 220, the travel direction 232, or a combination thereof. The current location 218 can represent that the user of the navigation system 100 can be in Sunnyvale, Calif. on US Highway 101. The destination 220 at the end of the travel route 222 of FIG. 2 can represent San Francisco, Calif. The travel direction 232 can represent heading north on US Highway 101. The context module 502 can determine the travel context 228 to be traveling from Sunnyvale to San Francisco.

For further example, the context module 502 can determine the travel context 228 based on the travel speed 234. For example, the travel speed 234 can represent 120 kilometers per hour. Factoring the current location 218, the context module 502 can determine the travel context 228 to be that the user is traveling on the highway. Furthermore, the context module 502 can determine the travel context 228 for the traffic condition 238 of FIG. 2 of whether the user of the navigation system 100 is stuck in traffic or not based on determining whether the travel speed 234 is above or below the speed limit.

For another example, the context module 502 can determine the travel context 228 based on the travel theme 236. The user can enter the travel theme 236 to the navigation system 100 as hiking at a national park. Factoring the destination 220, the context module 502 can determine the travel context 228 to be traveling to Yosemite for a hiking trip.

For another example, the context module 502 can determine the travel context 228 to represent that user is traveling on his or her favorite route based on the social indicator 308 of FIG. 3. More specifically, the user of the navigation system 100 can indicate his or her likes or dislikes on a social networking site regarding the travel segment 216. If the current location 218 is on the travel segment 216 or the travel segment 216 is upcoming along the path, the context module 502 can determine the travel context 228 to represent that the user is or will be traveling along his or her favorite route. The context module 502 can send the travel context 228 to a response module 503.

The navigation system 100 can include a response module 503, which can couple to the context module 502. The response module 503 generates the entry response 318 of FIG. 3. For example, the response module 503 can generate the entry response 318 based on the user entry 314 of FIG. 3 to allow interactive dialogue between the user and the navigation system 100.

For a specific example, the user of the navigation system 100 can make the user entry 314 representing the voice entry 316 of FIG. 3 of "going home." The response module 503 can generate the entry response 318 to confirm the voice entry 316 by presenting "navigating to home" in response to the voice entry 316. The response module 503 can send the entry response 318 to a customization module 504.

The navigation system 100 can include the customization module 504, which can couple to the response module 503. The customization module 504 determines the start guidance area 202 of FIG. 2, the end guidance area 204 of FIG. 2, or a combination thereof. For example, the customization module 504 can determine the start guidance area 202, the end guidance area 204, or a combination thereof based on the user entry 314.

The customization module 504 can determine the start guidance area 202, the end guidance area 204, or a combination thereof in a number of ways. The customization module 504 can include a start module 514 and an end module 516. The start module 514 determines the start guidance area 202. The end module 516 determines the end guidance area 204.

For example, the user entry 314 can represent the voice entry 316. The voice entry 316 can command the navigation system 100 to designate the start guidance area 202, the end guidance area 204, or a combination thereof to represent the geographic location 210 of FIG. 2, the geographic region 212 of FIG. 2, the travel segment 216, or a combination thereof. For a specific example, based on the voice entry 316 of "Start from San Francisco," the start module 514 can determine the start guidance area 202 to represent the geographic region 212 bordered by the city limit of San Francisco by parsing the voice entry 316 with keyword such as "Start" and unique instance of the geographic region 212 of "San Francisco."

For a different example, the voice entry 316 can represent "Stop on 101." Based on the voice entry 316, the end module 516 can determine the end guidance area 204 to represent the travel segment 216 by parsing the voice entry 316 with keyword such as "Stop" and unique instance of the travel segment 216 of "US Highway 101."

It has been discovered that the navigation system 100 allowing the user to designate the start guidance area 202, the end guidance area 204, or a combination thereof with the voice entry 316 improves the efficiency of tailoring the navigation guidance 208 of FIG. 2 to the user's needs. By allowing the voice entry 316 to command the navigation system 100, the navigation system 100 can allow the user to focus on operating the vehicle. Furthermore, by allowing the user to designate the start guidance area 202, the end guidance area 204, or a combination thereof, the navigation system 100 can remove unwanted instance of the navigation guidance 208, thus, improving the efficiency of delivering the navigation guidance 208. As a result, the navigation system 100 can improve the user's safe operation of the vehicle, the navigation system 100, or a combination thereof.

For another example, the customization module 504 can determine the start guidance area 202, the end guidance area 204, or a combination thereof based on the travel history 214 of FIG. 2, the travel context 228, or a combination thereof. More specifically, the travel history 214 can indicate that the user of the navigation system 100 has never traveled in the geographic region 212 in the past. The start module 514 can determine the start guidance area 202 to represent the geographic region 212 with no record of the travel history 214 by the user. In contrast, the end module 516 can determine the end guidance area 204 to represent the geographic region 212 where the travel history 214 indicates the user of the navigation system 100 travels the geographic region 212 daily.

It has been discovered that the navigation system 100 determining the start guidance area 202, the end guidance area 204, or a combination thereof based on the travel history 214 can improve the safety of the user of the navigation system 100. By recognizing whether the user is familiar with the geographic region 212 based on the travel history 214, the navigation system 100 can deliver the navigation guidance 208 to the user on as needed basis. As a result, the navigation system 100 can improve the safety of the user by providing the navigation guidance 208 when most needed.

For another example, the customization module 504 can determine the start guidance area 202, the end guidance area 204, or a combination thereof based on the travel context 228. More specifically, the travel context 228 can indicate that the traffic condition 238 of traffic jam. The start module 514 can determine the geographic location 210, the geographic region 212, the travel segment 216, or a combination thereof to be the start guidance area 202 when the travel context 228 represents a traffic jam. In contrast, the end module 516 can determine the geographic location 210, the geographic region 212, the travel segment 216, or a combination thereof to be the end guidance area 204 when the travel context 228 no longer represents a traffic jam. The customization module 504 can send the start guidance area 202, the end guidance area 204, or a combination thereof to a guidance module 506.

It has been discovered that the navigation system 100 determining the start guidance area 202, the end guidance area 204, or a combination thereof based on the travel context 228 can improve the safety of the user of the navigation system 100. By recognizing the necessity of the navigation guidance 208 based on the travel context 228, the navigation system 100 can deliver the navigation guidance 208 to the user on as needed basis. As a result, the navigation system 100 can improve the safety of the user by providing the navigation guidance 208 when most needed by the user.

The navigation system 100 can include the guidance module 506, which can couple to the customization module 504. The guidance module 506 generates the navigation guidance 208. For example, the guidance module 506 can generate the navigation guidance 208 based on the start guidance area 202, the end guidance area 204, or a combination thereof.

The guidance module 506 can include a guidance generator module 508. The guidance generator module 508 generates the navigation guidance 208. For example, the guidance generator module 508 can generate the navigation guidance 208 based on the start guidance area 202, the end guidance area 204, or a combination thereof.

The guidance generator module 508 can generate the navigation guidance 208 in a number of ways. For example, the guidance generator module 508 can generate the navigation guidance 208 representing the travel route 222 of FIG. 2, the voice guidance 226 of FIG. 2, or a combination thereof. For a specific example, the guidance generator module 508 can generate the travel route 222 starting from the start guidance area 202 rather than the current location 218. More specifically, the guidance generator module 508 can generate the travel route 222 starting from the start guidance area 202 excluding the current location 218. For another example, the guidance generator module 508 can generate the travel route 222 ending at the end guidance area 204 rather than the destination 220. More specifically, the guidance generator module 508 can generate the travel route 222 ending at the end guidance area 204 excluding the destination 220. For further example, the guidance generator module 508 can generate the travel route 222 from the start guidance area 202 to the end guidance area 204.

It has been discovered that the navigation system 100 generating the travel route 222 from the start guidance area 202 not at the current location 218 to the end guidance area 204 not at the destination 220 improves the efficiency of delivering the navigation guidance 208. By generating the travel route 222 between a location or area excluding the current location 218 and the destination 220, the navigation system 100 can provide the navigation guidance 208 tailored to the user's needs. As a result, the efficiency of delivering the navigation guidance 208 can improve the safety of the user operating the navigation system 100, the vehicle, or a combination thereof.

The guidance generator module 508 can generate the travel route 222 including, excluding, or a combination thereof the travel segment 216 from the travel route 222. More specifically, the travel theme 236 can be going home after a ski trip. The current location 218 can represent Lake Tahoe, Calif. and the destination 220 can represent user's home. The guidance generator module 508 can generate the travel route 222 having the travel segment 216 from the current location 218 to reach the route type 224 of FIG. 2 of freeway off ramp where the user exits to travel on local roads to reach the user's home. The end guidance area 204 can represent the travel segment 216 from the freeway off ramp to the user's home. The guidance generator module 508 can generate the travel route 222 starting from the current location 218 representing Lake Tahoe to the end guidance area 204 freeway off ramp but excluding the travel segment 216 from the freeway off ramp to the destination 220.

It has been discovered that the navigation system 100 generating the travel route 222 by including or excluding the travel segment 216 with the current location 218, the destination 220, or a combination thereof can improve the efficiency of delivering the navigation guidance 208. By generating the travel route 222 with or without the travel segment 216 having the current location 218, the destination 220, or a combination thereof, the navigation system 100 can provide the navigation guidance 208 tailored to the user's needs. As a result, the efficiency of delivering the navigation guidance 208 can improve the safety of the user operating the navigation system 100, the vehicle, or a combination thereof.

The guidance generator module 508 can generate the travel route 222 based on the user specified route 310 of FIG. 3. For example, the user specified route 310 can represent a path that represents the same as or different as the travel route 222 generated by the guidance generator module 508. More specifically, the guidance generator module 508 can generate a plurality of the travel route 222 with a plurality of the start guidance area 202, the end guidance area 204, or a combination thereof in combination with the user specified route 310.

For a specific example, the user specified route 310 can represent a scenic route, such as the 17 Mile Drive in Pebble Beach, Calif. The destination 220 can represent Monterey, Calif. For the first set, the start guidance area 202 can represent the current location 218 and the end guidance area 204 can represent the entrance to the 17 Mile Drive. The guidance generator module 508 can generate the first instance of the travel route 222 from the current location 218 to the entrance of 17 Mile Drive. For the second set, the start guidance area 202 can represent the end of the user specified route 310 and the end guidance area 204 can represent the destination 220. The guidance generator module 508 can generate the first instance of the travel route 222 from the end of the user specified route 310 to the destination 220. The guidance generator module 508 can generate the voice guidance 226 similarly as generating the travel route 222. The guidance generator module 508 can generate the navigation guidance 208 to a correlation module 510.

It has been discovered that the navigation system 100 generating the travel route 222 with the user specified route 310 can improve the efficiency of delivering the navigation guidance 208. By generating the travel route 222 with the user specified route 310, the navigation system 100 can provide the navigation guidance 208 tailored to the user's needs. As a result, the efficiency of delivering the navigation guidance 208 can improve the safety of the user operating the navigation system 100, the vehicle, or a combination thereof.

The navigation system 100 can include the correlation module 510, which can couple to the guidance module 506. The correlation module 510 determines the replaceable choice 302 of FIG. 3. For example, the correlation module 510 can determine the replaceable choice 302 based on the travel context 228, the visible area 306 of FIG. 3, the route type 224, or a combination thereof.

The correlation module 510 can determine the replaceable choice 302 in a number of ways. For example, a plurality of the travel route 222 can be generated for the user of the navigation system 100 to travel. And the plurality of the travel route 222 can share same instance of the travel segment 216 or can have the instance of the travel segment 216 excluded from one of the travel route 222. More specifically, one instance of the travel route 222 can start from the current location 218 representing Sunnyvale, Calif. to the destination 220 representing San Francisco, Calif. traveling through the route type 224 of Interstate Highway 280. Another instance of the travel route 222 can start from the current location 218 representing Sunnyvale, Calif. to the destination 220 representing San Francisco, Calif. traveling through the route type 224 of US Highway 101. The correlation module 510 can determine the replaceable choice 302 between the first instance of the travel route 222 and the second instance of the travel route 222 as a path for reaching the same instance of the destination 220 from the current location 218.

For further example, the correlation module 510 can determine the replaceable choice 302 between the different instances of the travel segment 216. As discussed above, the two instance of the travel route 222 can have the travel segment 216 unique to the travel route 222. For example, the unique instances of the travel segment 216 can represent Interstate Highway 280 and US Highway 101. The correlation module 510 can determine the replaceable choice 302 between the two instances of the travel segment 216 based on the travel context 228 of traveling to the same instance of the destination 220 from the same instance of the current location 218 heading towards the same instance of the travel direction 232.

For another example, the correlation module 510 can determine the replaceable choice 302 based on the visible area 306. More specifically, the correlation module 510 can determine that one instance of the travel segment 216 can represent the replaceable choice 302 if the travel segment 216 is displayed within the visible area 306. In contrast, the correlation module 510 can determine another instance of the travel segment 216 cannot represent the replaceable choice 302 if the travel segment 216 is not displayed within the visible area 306. For a specific example, the travel segment 216 representing Interstate Highway 880 will not be the replaceable choice 302 because the travel segment 216 is not within the visible area 306 of FIG. 3. In contrast, the travel segment 216 representing Interstate Highway 280 can be the replaceable choice 302 for the travel segment 216 representing US Highway 101 because Interstate Highway 280 is within the visible area 306. The correlation module 510 can send the replaceable choice 302 to the guidance module 506.

It has been discovered that the navigation system 100 determining the replaceable choice 302 based on the travel segment 216 within the visible area 306 can improve the efficiency of delivering the navigation guidance 208. By determining the replaceable choice 302 based on the travel segment 216 within the visible area 306, the navigation system 100 can efficiently select the travel segment 216 relevant to the user of the navigation system 100. As a result, the efficiency of delivering the navigation guidance 208 can improve the safety of the user operating the navigation system 100, the vehicle, or a combination thereof.

For illustrative purposes, the navigation system 100 is described with the response module 503 generating the entry response 318, although the response module 503 can be operated differently. For example, the response module 503 can generate the entry confirmation 320 of FIG. 3 based on the user entry 314, the replaceable choice 302, or a combination thereof.

For a specific example, the user entry 314 can represent the voice entry 316 for "add Interstate 280" to update the navigation guidance 208. As discussed above, the replaceable choice 302 is determined whether Interstate 280 can be added to the travel route 222. If the replaceable choice 302 is determined that the request made by the voice entry 316 is compliable by the navigation system 100, the response module 503 can generate the entry confirmation 320 to confirm and to proceed with the update of the navigation guidance 208. Furthermore, the response module 503 can generate the entry response 318 to notify the user of the navigation system 100 regarding the entry confirmation 320. In contrast, the response module 503 can generate the entry response 318 to notify the user if the replaceable choice 302 is unavailable to comply with the user entry 314. Moreover, the response module 503 can generate the entry response 318 to notify that the update to the navigation guidance 208 based on the user entry 314 was not possible and, as an example, provide an explanation why the request was not executed.

For a different example, the response module 503 can generate the entry confirmation 320 based on the start guidance area 202, the end guidance area 222, or a combination thereof. As an example, the response module 503 can generate the entry confirmation 320 based on whether the user of the navigation system 100 is inside or outside of the end guidance area 222.

If the user makes the user entry 314 outside of the end guidance area 222, the response module 503 can delay the entry confirmation 320 until the current location 218 is within the end guidance area 222. Furthermore, the response module 503 can generate the entry response 318 to ask the user whether the user would like to proceed with the user entry 314 made previously to update the navigation guidance 208. Moreover, the response module 503 can generate the entry response 318 prior to entering the end guidance area 222 or after crossing the boundary of the end guidance area 222. Once the entry response 318 is presented to the user, the response module 503 can receive the user entry 314 to confirm that the user indeed would like to proceed with the update the navigation guidance 208. Based on the user entry 314 representing a confirmation to proceed with the update, the response module 503 can generate the entry confirmation 320.

For illustrative purposes, the navigation system 100 is described with the guidance module 506 generating the navigation guidance 208, although the guidance module 506 can be operated differently. For example, the guidance module 506 can update the navigation guidance 208 based on the entry confirmation 320. The guidance module 506 can update the navigation guidance 208 in a number of ways.

The guidance module 506 can include a guidance updater module 512. The guidance updater module 512 updates the navigation guidance 208. For example, the guidance updater module 512 can update the navigation guidance 208 based on the modification option 312 of FIG. 3.

The guidance updater module 512 can update the navigation guidance 208 in a number of ways. For example, the guidance updater module 512 can update the navigation guidance 208 based on the entry confirmation 320 with the replaceable option choice 302.

For a different example, the guidance updater module 512 can update the navigation guidance 208 based on the modification option 312 by adding, removing, or a combination thereof of the travel segment 216 from the travel route 222. More specifically, the travel route 222 can represent the following plurality of the travel segment 216: local road; US Highway 101 North; US Highway 101 North; and local road. As shown, the travel route 222 can include two independent instances of the travel segment 216 represented by two different segments of US Highway 101 North. For example, the guidance updater module 512 can update the travel route 222 by removing one instance of the travel segment 216 representing US Highway 101 North and replacing the travel segment 216 with Interstate Highway 280. For further example, the guidance updater module 512 can update the travel route 222 while traversing along the travel route 222 or not traversing along the travel route 222.

For further example, the guidance updater module 512 can update the navigation guidance 208 based on the user entry 314. More specifically, the user entry 314 can represent the voice entry 316 of "Avoid 101 North between exits for San Tomas Expressway and Lawrence Expressway." The guidance updater module 512 can update the travel route 222 by identifying the keyword "Avoid" and instances of the travel segment 216 to be avoided, such as "San Tomas Expressway and Lawrence Expressway." Furthermore, the guidance updater module 512 can update the travel route 222 by removing the travel segment 216 specified by the voice entry 316 and replace the travel segment 216 with the travel segment 216 specified by the voice entry 316, such as "Add Interstate Highway 280."

More specifically, the voice entry 316 can represent a colloquial representation of the travel segment 216. The first storage unit 414 of FIG. 4, the second storage unit 446 of FIG. 4, or a combination thereof can store possible colloquial names that match with the official name designated by the government. For example, the official name can represent "San Mateo-Hayward Bridge." The colloquial name can represent "San Mateo Bridge." The voice entry 316 can state the travel segment 216 with the colloquial name of "San Mateo Bridge" for adding or removing the travel segment 216 from the navigation guidance 208. The guidance updater module 512 can match the colloquial name with the official name to identify the travel segment 216 to be updated. For further example, the guidance updater module 512 can update the travel route 222 based on the user entry 314 while traversing along the travel route 222 or not traversing along the travel route 222.

It has been discovered the navigation system 100 updating the travel route 222 by adding, replacing, or a combination thereof specified by the voice entry 316 can improve the efficiency of delivering the navigation guidance 208. By allowing the flexibility to pick and choose the travel segment 216 to be updated with the voice entry 316, the navigation system 100 can efficiently select the travel segment 216 most relevant to the user of the navigation system 100. As a result, the efficiency of delivering the navigation guidance 208 can improve the safety of the user operating the navigation system 100, the vehicle, or a combination thereof.

For another example, the guidance updater module 512 can replace the travel segment 216 based on the replaceable choice 302. As discussed above, the replaceable choice for US Highway 101 can represent Interstate Highway 280. The guidance updater module 512 can update the travel route 222 with the replaceable choice 302 of the travel segment 216 by replacing US Highway 101 with Interstate Highway 280.

For another example, the guidance updater module 512 can replace the travel segment 216 based on the travel context 228. More specifically, the guidance updater module 512 can replace the travel segment 216 with or without the replaceable choice 302. For a specific example, the traffic condition 238 for both US Highway 101 and Interstate Highway 280 can be heavy traffic jam. Interstate Highway 880 can be determined as not the replaceable choice 302. Based on the travel context 228, even though the travel segment 216 of Interstate Highway 280 was not the replaceable choice 302, the guidance updater module 512 can replace the travel segment 216 of US Highway 101 with Interstate Highway 880.

For another example, the guidance updater module 512 can update the navigation guidance 208 based on the social indicator 308. More specifically, the guidance updater module 512 can replace the travel segment 216 without the social indicator 308 with the travel segment 216 with the social indicator 308 of "like." For another example, the guidance updater module 512 can update the navigation guidance 208 based on the user specified route 310. The initial instance of the travel route 222 can exclude the travel segment 216 included in the user specified route 310. The guidance updater module 512 can update the travel route 222 to include the user specified route 310.

For another example, the guidance updater module 512 can update the navigation guidance 208 based on the start guidance area 202, the end guidance area 204, or a combination thereof. The travel route 222 can initially represent the path from the current location 218 to the destination. The start guidance area 202 can exclude the current location 218 and the end guidance area 204 can exclude the destination 220. The guidance updater module 512 can update the travel route 222 by removing the travel segment 216 excluded from the start guidance area 202, the end guidance area 204, or a combination thereof.

The physical transformation from traveling along the travel route 222 from one instance of the travel segment 216 to another instance of the travel segment 216 results in the movement in the physical world, such as people using the first device 102, the vehicle, or a combination thereof, based on the operation of the navigation system 100. As the movement in the physical world occurs, the movement itself creates additional information that is converted back into the start guidance area 202, the end guidance area 204 for updating the navigation guidance 208 for the continued operation of the navigation system 100 and to continue the movement in the physical world.

The first software 426 of FIG. 4 of the first device 102 of FIG. 4 can include the modules for the navigation system 100. For example, the first software 426 can include the context module 502, the customization module 504, the guidance module 506, and the correlation module 510.

The first control unit 412 of FIG. 4 can execute the first software 426 for the context module 502 to determine the travel context 228. The first control unit 412 can execute the first software 426 for the customization module 504 to determine the start guidance area 202, the end guidance area 204, or a combination thereof. The first control unit 412 can execute the first software 426 for the guidance module 506 to generate the navigation guidance 208. The first control unit 412 can execute the first software 426 for the correlation module 510 to determine the replaceable choice 302.

The second software 442 of FIG. 4 of the second device 106 of FIG. 4 can include the modules for the navigation system 100. For example, the second software 442 can include the context module 502, the customization module 504, the guidance module 506, and the correlation module 510.

The second control unit 434 of FIG. 4 can execute the second software 442 for the context module 502 to determine the travel context 228. The second control unit 434 can execute the second software 442 for the customization module 504 to determine the start guidance area 202, the end guidance area 204, or a combination thereof. The second control unit 434 can execute the second software 442 for the guidance module 506 to generate the navigation guidance 208. The second control unit 434 can execute the second software 442 for the correlation module 510 to determine the replaceable choice 302.

The modules of the navigation system 100 can be partitioned between the first software 426 and the second software 442. The second software 442 can include the context module 502, the customization module 504, and the guidance module 506. The second control unit 434 can execute modules partitioned on the second software 442 as previously described.

The first software 426 can include the correlation module 510. Based on the size of the first storage unit 414 of FIG. 4, the first software 426 can include additional modules of the navigation system 100. The first control unit 412 can execute the modules partitioned on the first software 426 as previously described.

The first control unit 412 can operate the first communication unit 416 of FIG. 4 to send the replaceable choice 302 to the second device 106. The first control unit 412 can operate the first software 426 to operate the location unit 420 of FIG. 4. The second communication unit 436 of FIG. 4 can send the navigation guidance 208 to the first device 102 through the communication path 104 of FIG. 4.

The navigation system 100 describes the module functions or order as an example. The modules can be partitioned differently. For example, the customization module 504 and the context module 502 can be combined. Each of the modules can operate individually and independently of the other modules.

Furthermore, data generated in one module can be used by another module without being directly coupled to each other. For example, the guidance module 506 can receive the travel context 228 from the context module 502.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively.

The modules described in this application can be stored in a non-transitory computer readable medium. The first storage unit 414, the second storage unit 446, or a combination thereof can represent the non-transitory computer readable medium. The first storage unit 414, the second storage unit 446, or a combination thereof or a portion thereof can be removable from the first device 102 or the second device 106. Examples of the non-transitory computer readable medium can be a non-volatile memory card or stick, an external hard disk drive, a tape cassette, or an optical disk.

It has been discovered that the navigation system 100 determining the start guidance area 202 excluding the current location 218 and the end guidance area 204 excluding the destination 220 improves the efficiency of delivering the navigation guidance 208 to the first device 102. By generating the navigation guidance 208 for the traversal between the start guidance area 202 and the end guidance area 204, the navigation system 100 can provide the navigation guidance 208 when most desired by the user. As a result, the navigation system 100 can efficiently allocate the resource to generate the navigation guidance 208, thus, improving the safety of the user by permitting the navigation system 100 to allocate more resources to other functionalities of the navigation system 100.

Figure 6:
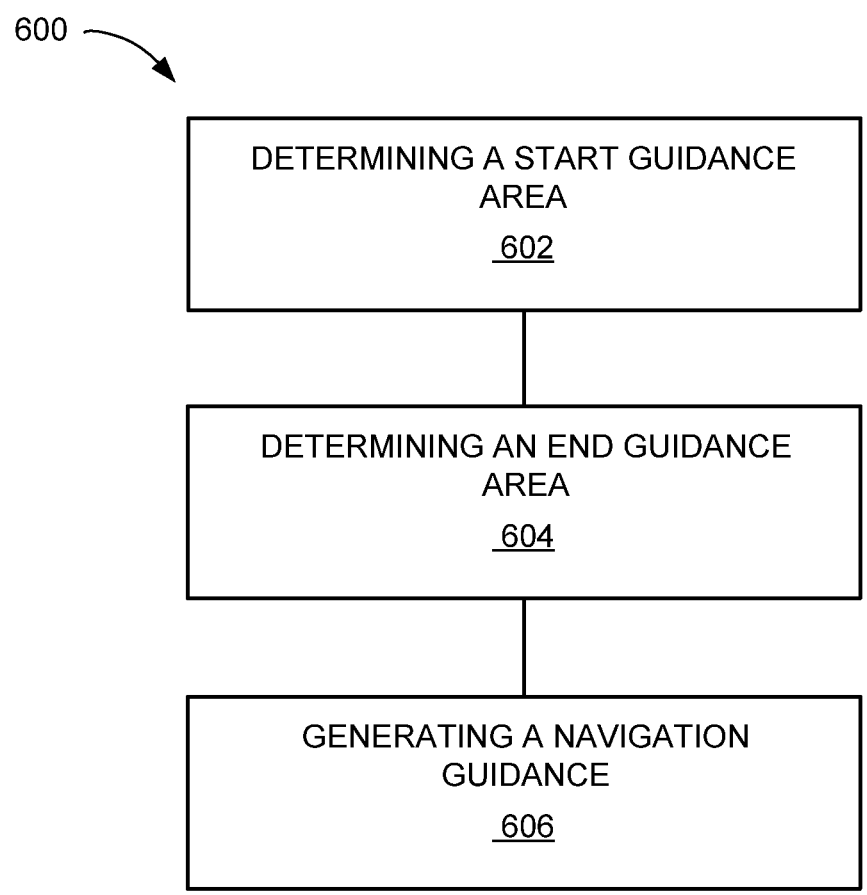
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a start guidance area excluding a current location in a block 602; determining an end guidance area excluding a destination in a block 604; and generating a navigation guidance with a control unit for traversing from the start guidance area to the end guidance area to reach the destination in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
generating an entry response based on a voice entry for receiving a user entry from a user interface;
generating a travel route from a current location to a destination based on a plurality of travel segments including identifying the current location by a location unit, implemented by a global positioning system (GPS), an inertial navigation system, or a cellular-tower location system;
determining a start guidance area, based on a travel history, the entry response, and a traffic condition for a geographic region, excluding the current location based on parsing the voice entry for initiating a navigation guidance wherein the voice entry includes a specific instance of a keyword, the geographic region, at least one of the travel segments, or a combination thereof;
determining an end guidance area, based on the travel history, the voice entry, and the traffic condition both different from the start guidance area, excluding the destination based on parsing the voice entry for stopping the navigation guidance wherein the voice entry includes the specific instance of the keyword, the geographic region, at least one of the travel segments, or a combination thereof;
determining a replaceable choice for at least one of the travel segments based on a visible area on the user interface;
updating the travel route based on removing the current location, the destination, the replaceable choice, or a combination thereof; and
generating the navigation guidance, with a control unit, including the travel route between the start guidance area and the end guidance area;
displaying the navigation guidance including the travel route according to the visible area on the user interface of a device.

2. The method as claimed in claim 1 wherein generating the navigation guidance includes generating the travel route from the start guidance area to the end guidance area, the travel route excluding the current location and the destination.

3. The method as claimed in claim 1 wherein generating the navigation guidance includes generating the travel route based on including a user specified route.

4. The method as claimed in claim 1 wherein generating the navigation guidance includes generating the travel route having the plurality of the travel segments; and
further comprising:
updating the travel route based on the voice entry for replacing one or more instances of the travel segments.

5. The method as claimed in claim 1 wherein generating the navigation guidance includes generating the travel route having the plurality of the travel segments; and
further comprising:
updating the travel route based on a modification option for adding, removing or a combination thereof one or more instances of the travel segments.

6. The method as claimed in claim 1 further comprising updating the navigation guidance while traversing along the travel route from the start guidance area to the end guidance area.

7. The method as claimed in claim 1 wherein determining the start guidance area includes determining the start guidance area based on the voice entry, a travel context, or a combination thereof for providing the navigation guidance.

8. The method as claimed in claim 1 wherein determining the end guidance area includes determining the end guidance area based on the voice entry, a travel context, or a combination thereof for providing the navigation guidance.

9. The method as claimed in claim 1 wherein determining the start guidance area includes determining the start guidance area based on the voice entry, the travel history, or a combination thereof for providing the navigation guidance.

10. The method as claimed in claim 1 wherein determining the end guidance area includes determining the end guidance area based on the voice entry, the travel history, or a combination thereof for providing the navigation guidance.

11. A navigation system comprising:
a control unit configured for:
generating an entry response based on a voice entry for receiving a user entry from a user interface;
generating a travel route from a current location to a destination based on a plurality of travel segments includes identifying the current location by a location unit, implemented by a global positioning system (GPS), an inertial navigation system, or a cellular-tower location system,
determining a start guidance area, based on a travel history, the entry response, and a traffic condition for a geographic region, excluding the current location f based on parsing the voice entry or initiating a navigation guidance wherein the voice entry includes a specific instance of a keyword, the geographic region, at least one of the travel segments, or a combination thereof, determining an end guidance area, based on the travel history, the entry response, and the traffic condition both different from the start guidance area, excluding the destination f based on parsing the voice entry or stopping the navigation guidance wherein the voice entry includes the specific instance of the keyword, the geographic region, at least one of the travel segments, or a combination thereof, determining a replaceable choice for at least one of the travel segments based on a visible area on the user interface;

updating the travel route based on removing the current location, the destination, the replaceable choice, or a combination thereof, generating the navigation guidance including the travel route between the start guidance area and the end guidance area, and the user interface, coupled to the control unit, configured for displaying the navigation guidance including the travel route according to the visible area on the user interface of a device.

12. The system as claimed in claim 11 wherein the control unit is configured for generating the travel route from the start guidance area to the end guidance area, the travel route excluding the current location and the destination.

13. The system as claimed in claim 11 wherein the control unit is configured for generating the travel route based on including a user specified route.

14. The system as claimed in claim 11 wherein the control unit is configured for:

generating the travel route having the plurality of the travel segments; and updating the travel route based on the voice entry for replacing one or more instances of the travel segments.

15. The system as claimed in claim 11 wherein the control unit is configured for:

generating the travel route having the plurality of the travel segments; and updating the travel route based on a modification option for adding, removing or a combination thereof one or more instances of the travel segments.

16. The system as claimed in claim 11 wherein the control unit is configured for updating the navigation guidance while traversing along the travel route from the start guidance area to the end guidance area.

17. The system as claimed in claim 11 wherein the control unit is configured for determining the start guidance area based on the voice entry, a travel context, or a combination thereof for providing the navigation guidance.

18. The system as claimed in claim 11 wherein the control unit is configured for determining the end guidance area based on the voice entry, a travel context, or a combination thereof for providing the navigation guidance.

19. The system as claimed in claim 11 wherein the control unit is configured for determining the start guidance area based on the voice entry, the travel history, or a combination thereof for providing the navigation guidance.

20. The system as claimed in claim 11 wherein the control unit is configured for determining the end guidance area based on the voice entry, the travel history, or a combination thereof for providing the navigation guidance.

* * * * *